(12) United States Patent
Ito

(10) Patent No.: US 11,665,428 B2
(45) Date of Patent: May 30, 2023

(54) LENS APPARATUS, IMAGE PICKUP SYSTEM, CONTROL METHOD OF LENS APPARATUS, AND STORAGE MEDIUM

(71) Applicant: CANON KABUSHIKI KAISHA, Tokyo (JP)

(72) Inventor: Rumi Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/564,611

(22) Filed: Dec. 29, 2021

(65) Prior Publication Data

US 2022/0264010 A1 Aug. 18, 2022

(30) Foreign Application Priority Data

Feb. 15, 2021 (JP) .............................. JP2021-021581

(51) Int. Cl.
| | | |
|---|---|---|
| H04N 5/232 | (2006.01) | |
| H04N 23/68 | (2023.01) | |
| G02B 27/64 | (2006.01) | |
| G03B 5/00 | (2021.01) | |
| H04N 23/55 | (2023.01) | |
| G03B 17/14 | (2021.01) | |
| G02B 7/14 | (2021.01) | |

(52) U.S. Cl.
CPC ......... *H04N 23/687* (2023.01); *G02B 27/646* (2013.01); *G03B 5/00* (2013.01); *H04N 23/55* (2023.01); *H04N 23/681* (2023.01); *H04N 23/6812* (2023.01); *G02B 7/14* (2013.01); *G03B 17/14* (2013.01); *G03B 2205/0007* (2013.01)

(58) Field of Classification Search
CPC . H04N 23/68; G02B 7/14; G02B 7/16; G03B 17/12; G03B 17/14
USPC ..................................................... 348/208.99
See application file for complete search history.

(56) References Cited

U.S. PATENT DOCUMENTS

2021/0294181 A1* 9/2021 Ohishi .................. G03B 17/02

FOREIGN PATENT DOCUMENTS

| JP | 2007033740 A | 2/2007 | |
| JP | 2013174639 A | 9/2013 | |
| WO | WO-2020095623 A1 * | 5/2020 | ........... G02B 27/646 |

* cited by examiner

*Primary Examiner* — Anthony J Daniels
(74) *Attorney, Agent, or Firm* — Rossi, Kimms & McDowell LLP

(57) ABSTRACT

A lens apparatus attachable to and detachable from an image pickup apparatus includes a detector configured to detect an angular shake of the lens apparatus, an image stabilizer configured to provide an image stabilization by driving part of an imaging optical system in the lens apparatus, and a controller configured to calculate a driving amount using a rotation angle based on an output of the detector and information for converting the rotation angle into the driving amount. The controller changes the information based on the image pickup apparatus attached to the lens apparatus.

10 Claims, 10 Drawing Sheets

LENS APPARATUS, IMAGE PICKUP SYSTEM, CONTROL METHOD OF LENS APPARATUS, AND STORAGE MEDIUM

BACKGROUND OF THE INVENTION

Field of the Invention

The present invention relates to a lens apparatus having an image stabilizing apparatus.

Description of the Related Art

There have conventionally been known an image pickup apparatus (camera body) and a lens apparatus (interchangeable lens) each having a (image stabilizing) function of correcting an image shake in an image caused by shakes such as camera shake. Japanese Patent Application No. ("JP") 2013-174639 discloses a method of activating the image stabilizing function of the interchangeable lens depending on whether the camera body has the image stabilizing function. JP 2007-33740 discloses an image stabilizing method in which the camera body provides a translational image stabilization and an interchangeable lens provides an angular image stabilization.

The method disclosed in JP 2013-174639 does not activate the image stabilizing function of the interchangeable lens when the camera body has the image stabilizing function. Therefore, the image stabilizing function of the interchangeable lens cannot be effectively utilized.

The method disclosed in JP 2007-33740 cannot provide a proper image stabilization when an interchangeable lens having no translational image-stabilizing function is attached to a camera body having no translational image-stabilizing function, because the influence of the translational shake cannot be removed.

SUMMARY OF THE INVENTION

The present invention provides a lens apparatus, an image pickup system, a control method for the lens apparatus, and a storage medium, each of which can perform a proper image stabilization regardless of whether or not the camera body has a translational image-stabilizing function.

A lens apparatus attachable to and detachable from an image pickup apparatus includes a detector configured to detect an angular shake of the lens apparatus, an image stabilizer configured to provide an image stabilization by driving part of an imaging optical system in the lens apparatus, and a controller configured to calculate a driving amount using a rotation angle based on an output of the detector and information for converting the rotation angle into the driving amount. The controller changes the information based on the image pickup apparatus attached to the lens apparatus. An image pickup apparatus having the above lens apparatus, and a control method corresponding to the above lens apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
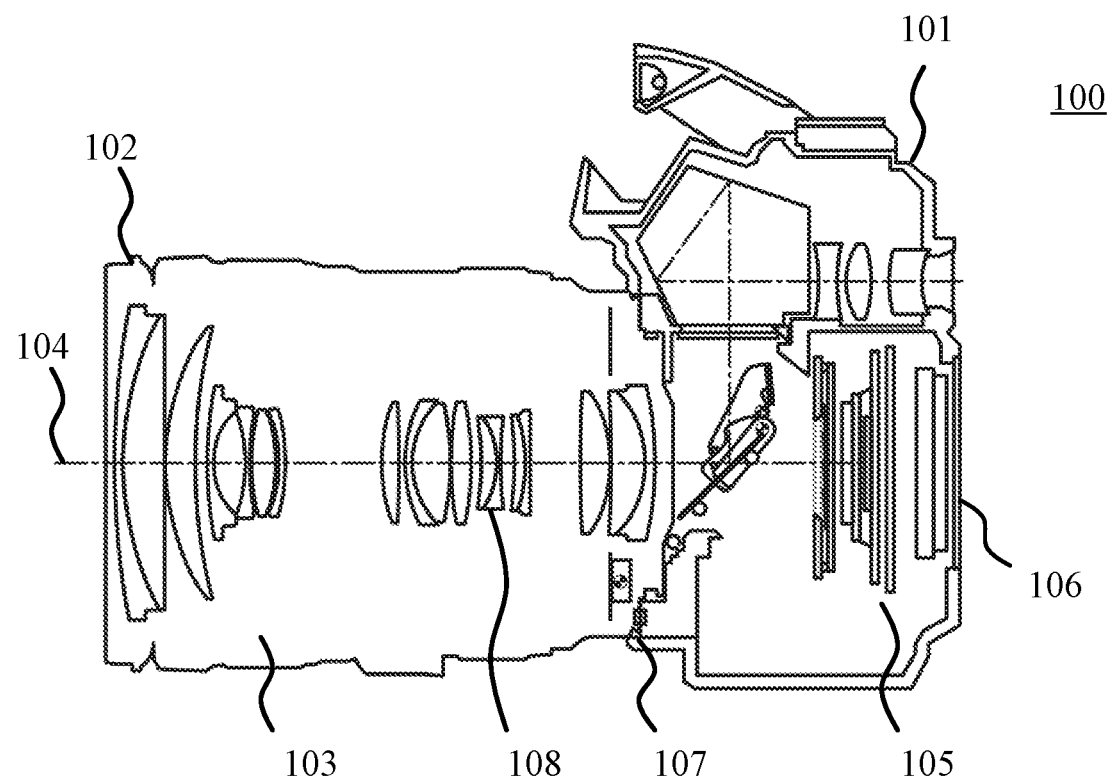
FIG. 1 illustrates a central section of an image pickup system according to each embodiment.

Referring now to FIGS. 1 to 7, a description will be given of an image pickup system (camera system) 100 according to a first embodiment of the present invention. FIG. 1 illustrates a central section of the image pickup system 100. The image pickup system 100 includes an image pickup apparatus (camera body) 101, and an interchangeable lens (lens apparatus) 102 attachable to and detachable from the image pickup apparatus 101. Reference numeral 103 denotes an imaging optical system including a plurality of lenses. Reference numeral 104 denotes an optical axis of the imaging optical system 103. Reference numeral 105 denotes an image sensor (image pickup element). Reference numeral 106 denotes a rear display unit. Reference numeral 107 denotes an electrical contact between the image pickup apparatus 101 and the interchangeable lens 102. Reference numeral 108 denotes an image-stabilizing lens unit (image stabilizer) provided to an interchangeable lens 102.

Figure 2:
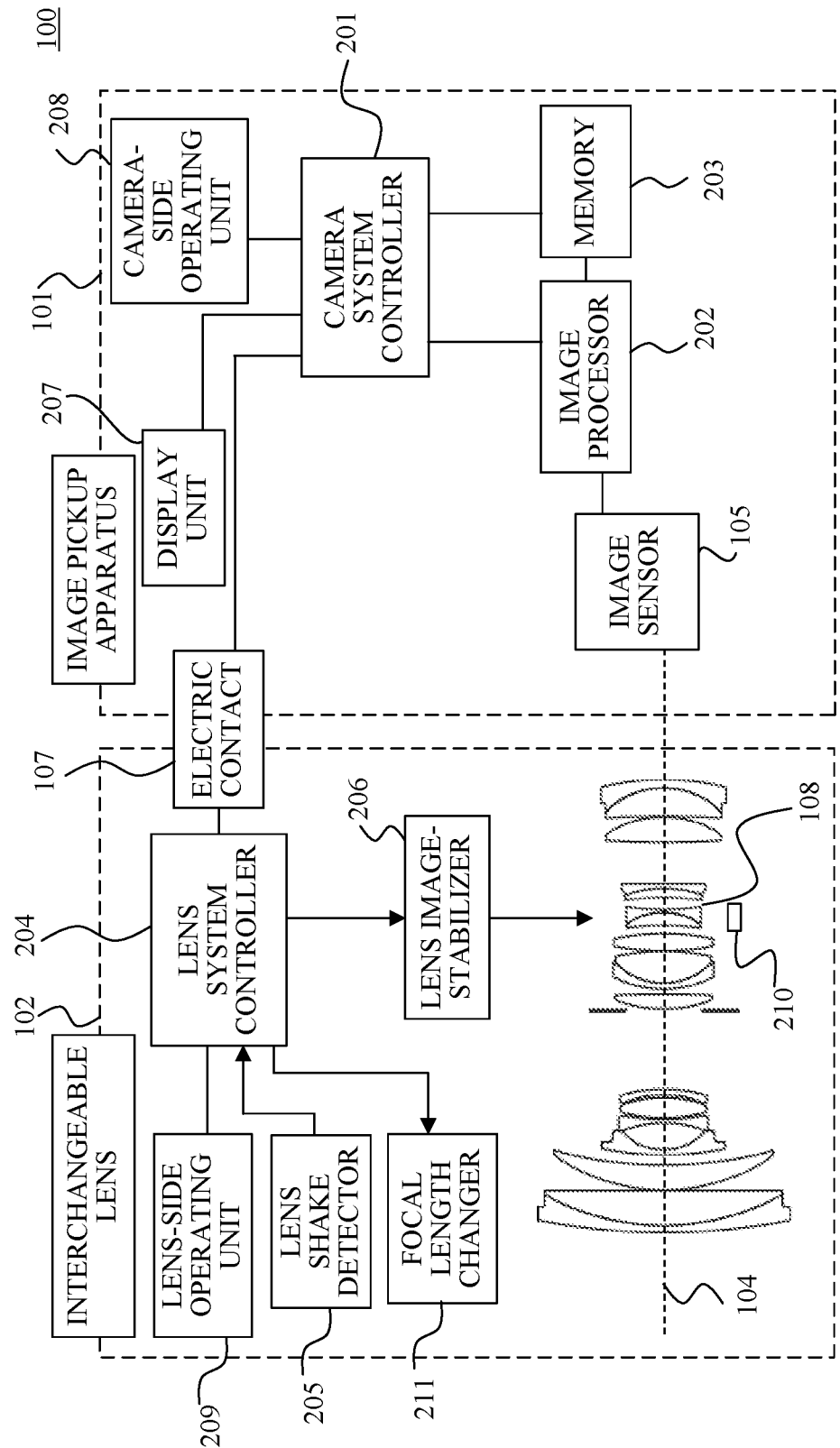
FIG. 2 is a block diagram of the image pickup system according to each embodiment.

FIG. 2 is a block diagram illustrating an electrical configuration of the image pickup apparatus 101. Those elements designated by the same reference numerals in FIGS. 1 and 2 correspond to each other. Reference numeral 201 denotes a camera system controller. Reference numeral 202 denotes an image processor. Reference numeral 203 denotes a memory. Reference numeral 204 denotes a lens system controller provided to the interchangeable lens 102. Reference numeral 205 denotes a lens shake detector for detecting a shake amount of the image pickup apparatus 101 provided to the interchangeable lens 102. Reference numeral 206 denotes a lens image-stabilizer for correcting image shakes by driving the image-stabilizing lens unit 108 (part of the imaging optical system in the interchangeable lens 102).

The image pickup system 100 including the image pickup apparatus 101 and the interchangeable lens 102 includes an imaging unit (imaging system), an image processing unit (image processing system), a recorder/reproducer (recording/reproducing system), and a controller (control system). The imaging unit includes the imaging optical system 103 and the image sensor 105. The image processing unit includes the image processor 202. The recorder/reproducer include the memory 203 and a display unit 207. The display unit 207 includes the rear display unit 106, an unillustrated small display panel for displaying imaging information provided to a top surface of the image pickup apparatus 101, an unillustrated electronic viewfinder (EVF), and the like. The controller includes the camera system controller 201, a camera-side operating unit 208, the lens system controller 204, a lens-side operating unit 209, the lens shake detector 205, the lens image-stabilizer 206, a lens position detector 210, and a focal length changer 211. In addition to the image-stabilizing lens unit 108, the lens system controller 204 can drive a focus lens, a diaphragm, a zoom lens, and the like (not shown).

The lens shake detector 205 includes an angular shake detector that can detect a rotation (angular shake (rotational shake) generated by the rotation) with respect to the optical axis 104 of the image pickup system 100. The angular shake detector is, for example, a gyro sensor. The lens image-stabilizer 206 is a mechanism for shifting or tilting the image-stabilizing lens unit 108 on a plane orthogonal to the optical axis 104.

The imaging unit includes an optical processing system that images light from an object on the imaging plane of the image sensor 105 via the imaging optical system 103. Since a focus evaluating amount and a proper exposure amount can be acquired from the image sensor 105 and the imaging optical system 103 is properly adjusted based on a signal from the image sensor 105, object light having a proper light amount can be exposed on the image sensor 105 and the object image is formed near the image sensor 105.

The image processor 202 includes an A/D converter, a white balance adjusting circuit, a gamma correcting circuit, an interpolation calculating circuit, and the like, and can generate an image for recording. The image processor 202 includes a color interpolation processor, performs color interpolation (demosaicing) processing from a Bayer array signal, and generates a colored image. The image processor 202 compresses a still image, a motion image, an audio, or the like using a predetermined method. The memory 203 has a storage unit. The camera system controller 201 provides an output to the recorder of the memory 203, and displays an image to be presented to the user on the display unit 207.

The camera system controller 201 generates and outputs a timing signal or the like during imaging. The imaging unit, the image processing unit, and the recorder/reproducer are controlled in response to an external operation. For example, the camera system controller 201 detects pressing of a shutter release button (not shown) and controls driving of the image sensor 105, an operation of the image processor 202, compression processing, and the like. The camera system controller 201 controls a state of each segment of the information display apparatus that displays information on the display unit 207. The rear display unit 106 is a touch panel, and may serve as the display unit 207 and the camera-side operating unit 208.

A description will now be given of an adjusting operation of the optical system by the controller. The image processor 202 is connected to the camera system controller 201, and a proper focus position and diaphragm position are obtained based on a signal from the image sensor 105 and a user operation through the camera-side operating unit 208. The camera system controller 201 issues a command to the lens system controller 204 via the electric contact 107, and the lens system controller 204 properly controls the focal length changer 211 and an unillustrated diaphragm driver. In an image stabilizing mode, the lens image-stabilizer 206 is properly controlled based on the signal obtained from the lens shake detector 205 and information of the lens position detector 210. The lens image-stabilizer 206 can be realized, for example, by a magnet and a flat plate coil. The lens position detector 210 can be realized, for example, by a magnet and a Hall element.

As a specific control method, first, the lens system controller 204 detects the shake signal detected by the lens shake detector 205. Based on the result, the driving amount of the image-stabilizing lens unit 108 for the image stabilization is calculated. Thereafter, the calculated driving amount is sent as a command value to the lens image-stabilizer 206, and a feedback control is made such that the position detected by the lens position detector 210 follows the command value, thereby driving the image-stabilizing lens unit 108. As described above, a still image and a motion image can be captured by controlling the operation of each component of the image pickup apparatus 101 according to the user's operation on the camera-side operating unit 208.

Figure 3:
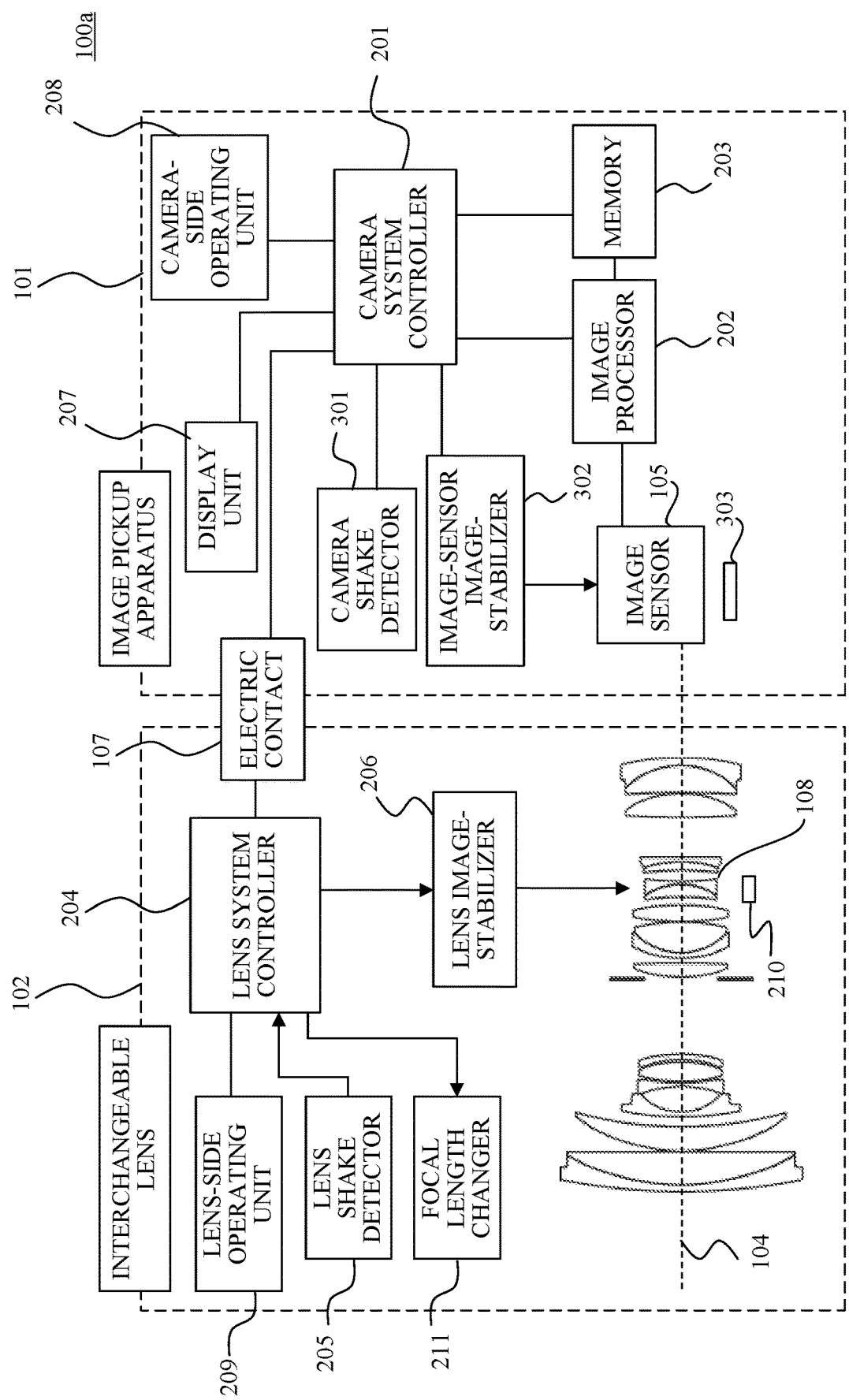
FIG. 3 is a block diagram of an image pickup system according to a modification of each embodiment.

FIG. 3 is a block diagram illustrating an electrical configuration of an image pickup system 100a according to a modification of this embodiment. The image pickup apparatus 101a illustrated in FIG. 3 includes an image stabilizing mechanism as a controller in addition to the image pickup apparatus 101 illustrated in FIG. 2. The image stabilizing mechanism of the image pickup apparatus 101a includes a camera shake detector 301, an image-sensor image-stabilizer 302, and an image-sensor-position detector 303. The camera shake detector 301 detects a shake amount of the image pickup apparatus 101a. The image-sensor image-stabilizer 302 drives the image sensor 105 for the image stabilization.

The camera shake detector 301 can detect a rotation with respect to the optical axis 104 applied to the image pickup apparatus 101a (angular shake (rotational shake)) and a translational shake (shift shake) generated by a parallel movement on a plane orthogonal to the optical axis 104. The camera shake detector 301 includes an angular shake detector for detecting an angular shake and a translational shake detector for detecting a translational shake. The angular shake detector is, for example, a gyro sensor. The translational shake detector is, for example, an acceleration sensor. Alternatively, a function as the camera shake detector 301 may be realized by generating a shake detection signal based on a comparison between a plurality of images obtained from the image sensor 105 by the image processor 202. The image-sensor image-stabilizer 302 is a mechanism for shifting or tilting the image sensor 105 on the plane orthogonal to the optical axis 104.

In the image stabilizing mode, the image pickup apparatus 101a illustrated in FIG. 3 properly controls the image-sensor image-stabilizer 302 and the lens image-stabilizer 206. That is, the image pickup apparatus 101a controls the image-sensor image-stabilizer 302 and the lens image-stabilizer 206 based on the signals obtained from the lens shake detector 205 and the camera shake detector 301 and the information of the lens position detector 210 and the image-sensor-position detector 303. As a specific control method, first, the camera system controller 201 and the lens system controller 204 detect the shake signals detected by the camera shake detector 301 and the lens shake detector 205, respectively. Based on the result, the camera system controller 201 and the lens system controller 204 calculate the driving amounts of the image sensor 105 and the image-stabilizing lens unit 108 for the image stabilization, respectively. Thereafter, the camera system controller 201 and the lens system controller 204 send as command values the calculated driving amounts to the image-sensor image-stabilizer 302 and the lens image-stabilizer 206, respectively. The image sensor 105 and the image-stabilizing lens unit 108 are driven by performing a feedback control so that the positions detected by the lens position detector 210 and the image-sensor-position detector 303 follow the command values, respectively.

Figure 4:
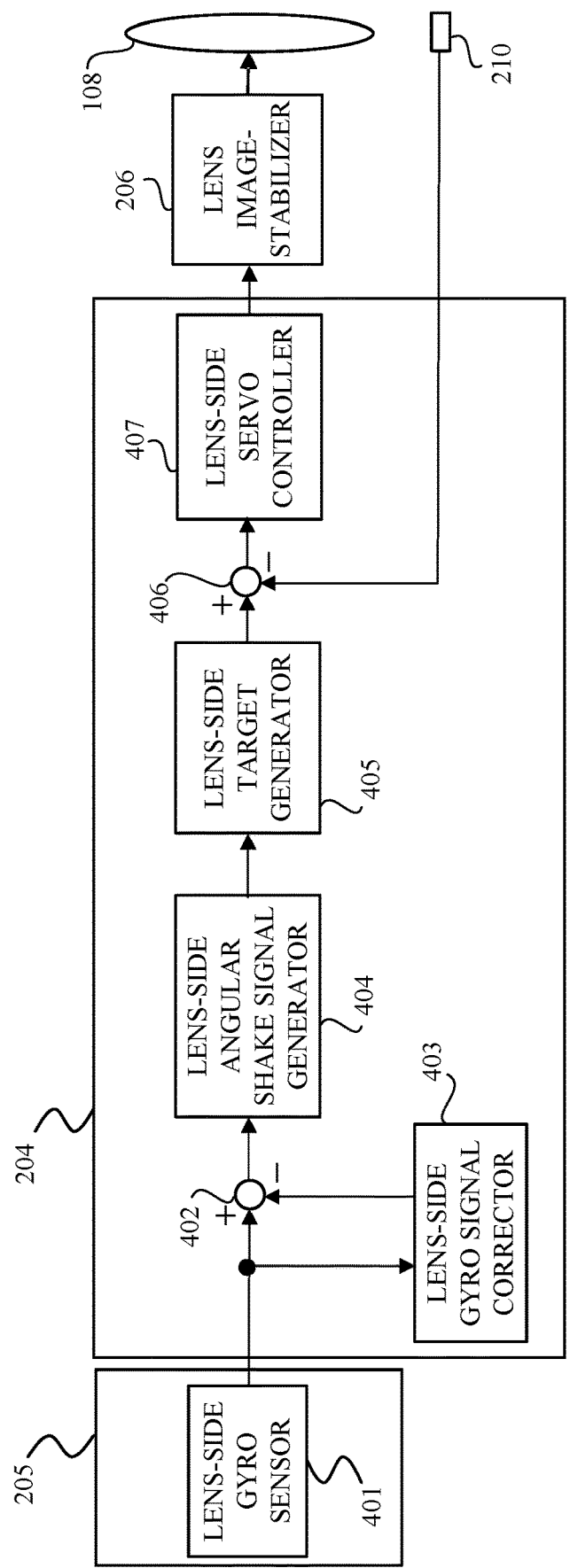
FIG. 4 is a block diagram of an image-stabilizing system controller according to the first embodiment.
Figure 5:
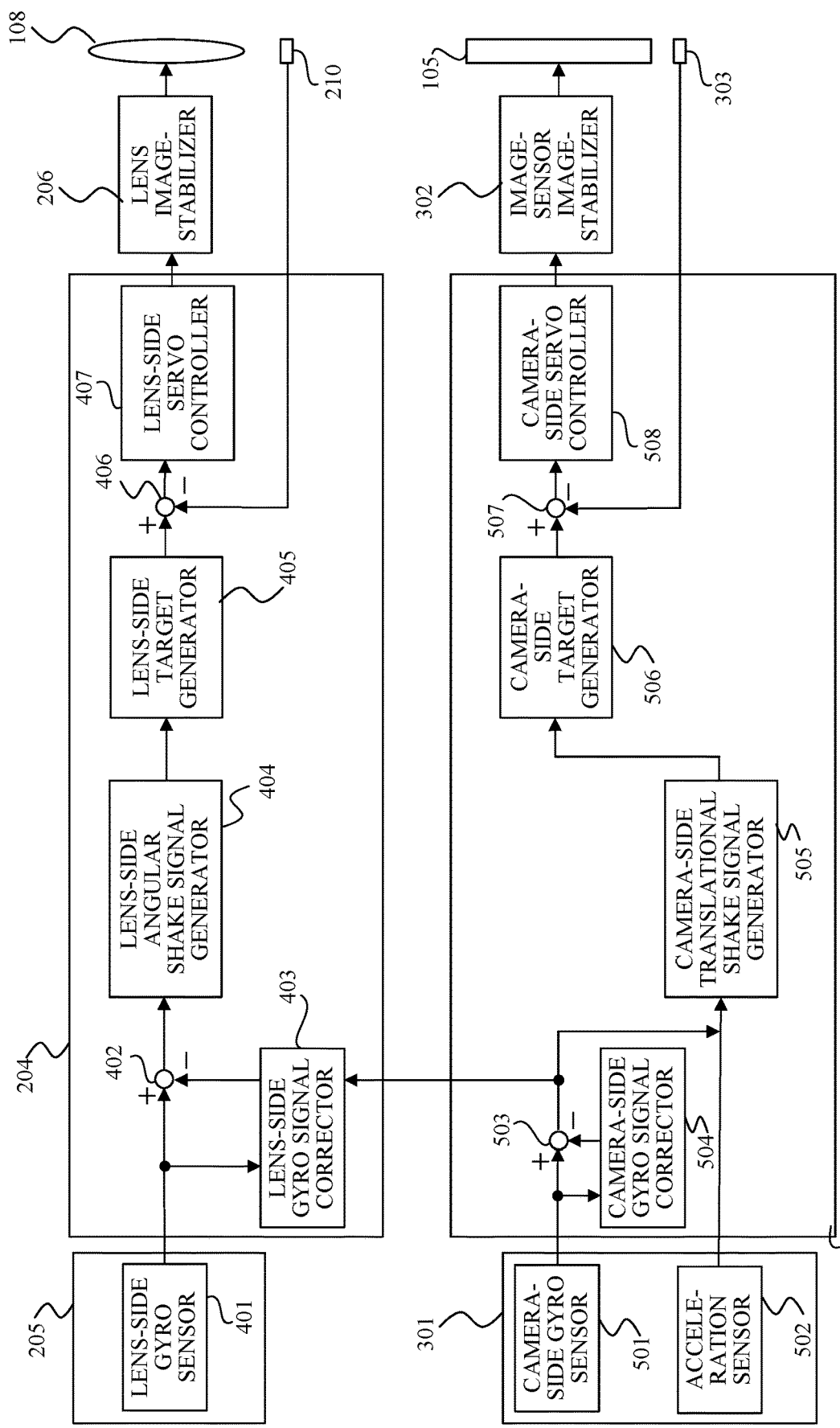
FIG. 5 is a block diagram of an image-stabilizing system controller according to a modification of the first embodiment.

Referring now to FIGS. 4 and 5, a description will now be given of a configuration of the image-stabilizing system controller in this embodiment. FIG. 4 is a block diagram of the image-stabilizing system controller of the image pickup apparatus 101 illustrated in FIG. 2. In FIG. 4, the lens shake detector 205 has a lens-side gyro sensor 401. Each of reference numerals 402 and 306 denotes an adder. Reference numeral 403 denotes a lens-side gyro signal corrector. Reference numeral 404 denotes a lens-side angular shake signal generator. Reference numeral 405 is a lens-side target generator. Reference numeral 407 denotes a lens-side servo controller. The lens system controller 204 includes these components. Reference numeral 108 denotes an image-stabilizing lens unit. Reference numeral 206 denotes a lens image-stabilizer. Reference numeral 210 denotes a lens position detector for acquiring the position of the image-stabilizing lens unit 108.

FIG. 5 is a block diagram of the image-stabilizing system controller of the image pickup apparatus 101a illustrated in FIG. 3. Similar to the image pickup apparatus 101 illustrated in FIG. 2, the image pickup apparatus 101a illustrated in FIG. 3 includes the lens shake detector 205, the lens system controller 204, the lens image-stabilizer 206, the image-stabilizing lens unit 108, and the lens position detector 210. The image pickup apparatus 101a includes the camera shake detector 301, the camera system controller 201, the image-sensor image-stabilizer 302, the image sensor 105, and the image-sensor-position detector 303. The camera shake detector 301 includes a camera-side gyro sensor 501 and an acceleration sensor 502. The camera system controller 201 includes adders 503 and 507, a camera-side gyro signal corrector 504, a camera-side translational shake signal generator 505, a camera-side target generator 506, and a camera-side servo controller 508.

Figure 6:
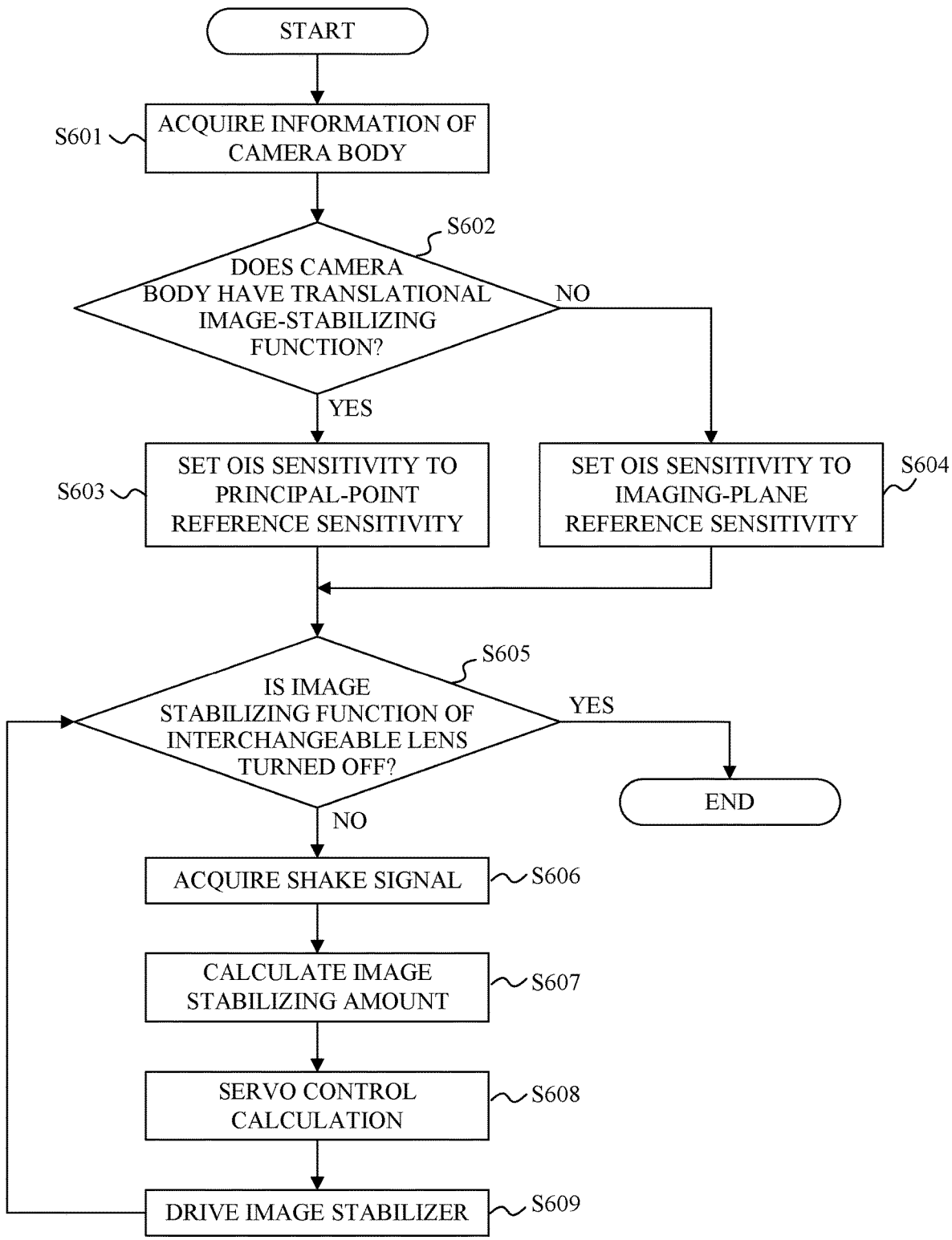
FIG. 6 is a flowchart of image stabilizing processing in an interchangeable lens according to the first embodiment.

Referring now to FIG. 6, a description will be given of image stabilizing processing of the interchangeable lens 102 attachable to and detachable from the image pickup apparatus 101 (or the image pickup apparatus 101a). FIG. 6 is a flowchart of the image stabilizing processing in the interchangeable lens 102 according to this embodiment. When power is supplied to the image pickup apparatus 101 (101a) and the interchangeable lens 102, the lens system controller 204 starts processing. First, in the step S601, the lens system controller 204 acquires information (type of the image pickup apparatus) of the image pickup apparatus (camera body) through communications.

Next, in the step S602, the lens system controller 204 determines whether or not the image pickup apparatus has (is mounted with) a translational image-stabilizing function based on the information of the image pickup apparatus acquired in the step S601. If the image pickup apparatus has the translational image-stabilizing function, that is, if the image pickup apparatus is the image pickup apparatus 101a illustrated in FIGS. 3 and 5, the flow proceeds to the step S603. On the other hand, if the image pickup apparatus has no translational image-stabilizing function, that is, if the image pickup apparatus is the image pickup apparatus 101 illustrated in FIGS. 2 and 4, the flow proceeds to the step S604.

In the step S603, the lens system controller 204 sets an OIS (Optical Image Stabilizer) sensitivity (sensitivity of the image-stabilizing lens unit 108) to the principal-point reference sensitivity of the optical system, and proceeds to the step S605. In the step S604, the lens system controller 204 sets the OIS sensitivity to the imaging-plane reference sensitivity of the image pickup apparatus, and proceeds to the step S605. The OIS sensitivity includes information (conversion coefficient) for converting an angle signal (rotation angle) generated by the lens-side angular shake signal generator 404 into a driving amount of the image-stabilizing lens unit 108 by the lens-side target generator 405.

Next, in the step S605, the lens system controller 204 determines whether or not the image stabilizing function of the interchangeable lens 102 is turned off. When the image stabilizing function of the interchangeable lens 102 is turned off, the processing ends. On the other hand, when the image stabilizing function of the interchangeable lens 102 is turned on, the flow proceeds to the step S606.

In the step S606, the lens system controller 204 removes an offset component from the shake amount acquired by the lens shake detector 205 through the adder 402 and the lens-side gyro signal corrector 403, and acquires the lens-side shake amount. FIG. 4 illustrates the lens-side gyro signal corrector 403 corrects the shake signal using only the information of the lens-side gyro sensor 401, but may correct the shake signal using other information such as the image information of the image pickup apparatus 101. FIG. 5 illustrates that the signal of the lens-side gyro sensor 401 is corrected based on the signal of the camera-side gyro sensor 501 corrected by the camera-side gyro signal corrector 504, but it may be corrected based on other information of the image pickup apparatus 101a. Alternatively, the correction may be made using only the information of the interchangeable lens 102.

Next, in the step S607, the lens system controller 204 converts the shake signal from the angle into the driving amount of the lens image-stabilizer 206 based on the OIS sensitivity determined in the step S603 or S604. The lens system controller 204 inputs the converted driving amount as a target value to the adder 406 (calculates the image stabilizing amount). Next, in the step S608, the lens system controller 204 acquires the position of the lens image-stabilizer 206 detected by the lens position detector 210. The lens system controller 204 compares the lens-side image-stabilizing target value generated in the step S607 with the position of the lens image-stabilizer, and calculates a feedback control amount using the lens-side servo controller 407 (servo control calculation). Next, in the step S609, the lens system controller 204 provides the image stabilization (drives the image stabilizer) by driving the lens image-stabilizer 206 according to the feedback control amount calculated in the step S608.

Figure 7A:
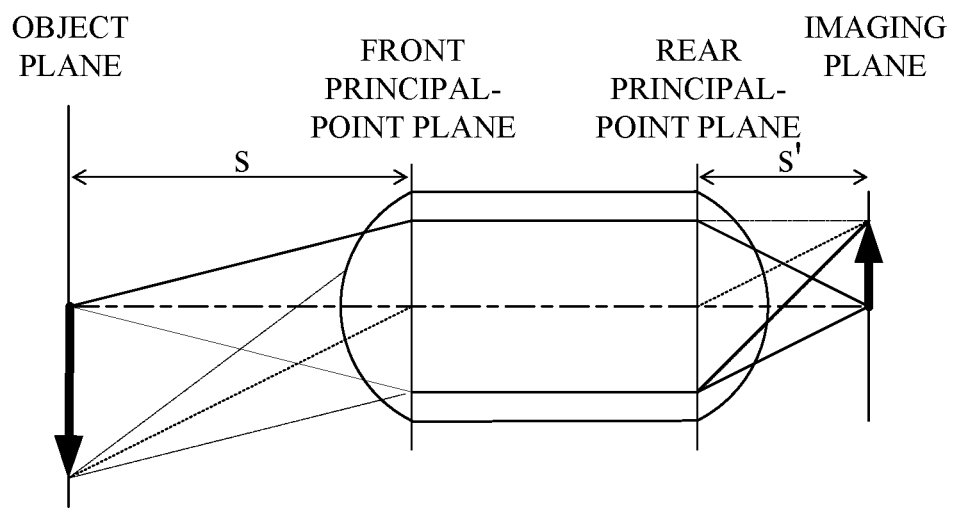
FIGS. 7A to 7D explain a rotation center of shake and an image-plane shake amount according to each embodiment.
Figure 7B:
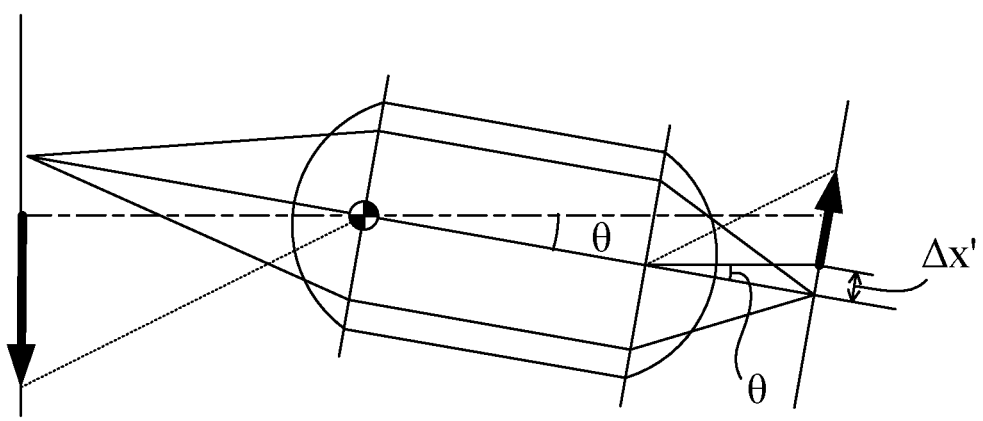

Referring now to FIGS. 7A to 7D, a description will be given of a shake amount, a rotation center, and influence on an image plane of the image pickup apparatus. FIGS. 7A to 7D explain the rotation center of the shake and the image-plane shake amount, and illustrate optical path diagrams when the object forms an image on the image plane through an (imaging) optical system. FIG. 7A illustrates a state in which the image pickup system is not shaken. FIG. 7B illustrates an optical path diagram when the image pickup system is rotated by an angle θ around the principal-point position (front principal point) of the imaging optical system from the state illustrated in FIG. 7A, that is, when an angular shake of an angle θ occurs. The rotation angle θ of the front principal point can be detected by the lens-side gyro sensor 401. At this time, the imaging position on the imaging plane is displaced by a displacement amount Δx'. The displacement amount Δx' can be expressed by the following expression (1).

$$\Delta x' = s' \tan \theta \approx s'\theta \ldots \quad (1)$$

In the expression (1), s' is a distance from the rear principal-point surface of the optical system to the imaging plane. In this case, the lens-side target generator 405 calculates a target driving amount $K_1\theta$ of the image-stabilizing lens unit 108 such that the image is moved by s'θ on the imaging plane. A coefficient $K_1$ is defined as a front principal-point reference OIS sensitivity. Thereafter, the lens image-stabilizer 206 drives the image-stabilizing lens unit 108 to the target driving amount $K_1\theta$ for a proper image stabilization.

Figure 7C:
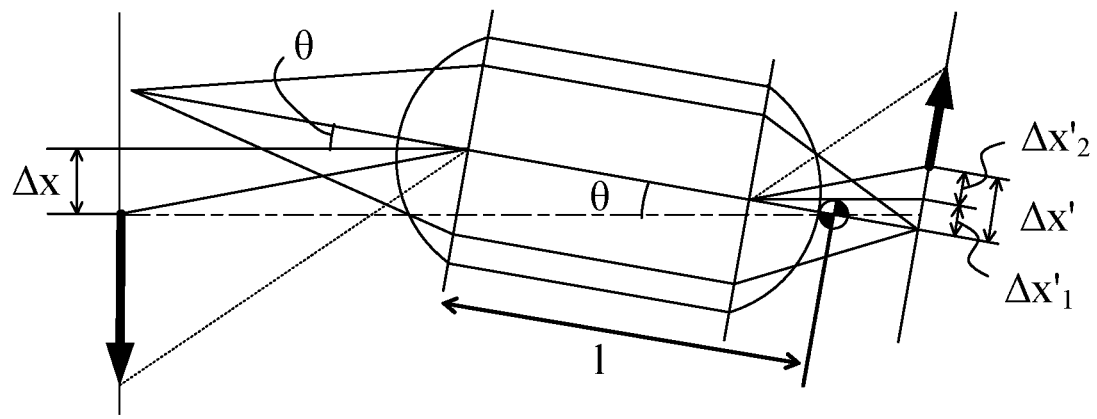

FIG. 7C illustrates an optical path diagram when the image pickup system is rotated by the angle θ from the state of FIG. 7A around an arbitrary point as a center. This is equivalent with the image pickup system rotated by the angle θ around the principal-point position (front principal point) of the optical system and translated by the displacement amount Δx. That is, this state has an angular shake at an angle θ and a translational shake of a displacement amount Δx. At this time, the imaging position on the imaging plane is displaced by the angular shake Δx' 1 and the translational shake Δx'2, respectively, and the displacement amount Δx'1+Δx'2 of the imaging position on the imaging plane is expressed by the following expression (2).

$$\Delta x'_1 + \Delta x'_2 = s' \tan \theta + \beta \Delta x = s' \tan \theta + l\beta \sin \theta \approx s'\theta + l\beta\theta \ldots \quad (2)$$

In the expression (2), β denotes an imaging magnification of the optical system, and l denotes a distance from the front principal point of the optical system to the rotation-center position of the image pickup apparatus. The distance l cannot be detected only by the gyro sensor, and can be calculated by using information such as the acceleration sensor 502. In this embodiment, when the interchangeable lens 102 is attached to the image pickup apparatus 101a illustrated in FIG. 3, the image-sensor image-stabilizer 302 is used for the translational image stabilization, and the lens image-stabilizer 206 is used for the angular image stabilization. As in the case of FIG. 7B, the angular image stabilization can be made by driving the image-stabilizing lens unit 108 to the target driving amount $K_1\theta$. On the other hand, when the interchangeable lens 102 is attached to the image pickup apparatus 101 illustrated in FIG. 2, the translational shake cannot be detected and corrected. Therefore, even if the image-stabilizing lens unit 108 is driven to the target driving amount $K_1\theta$, the translational shake remains.

Figure 7D:
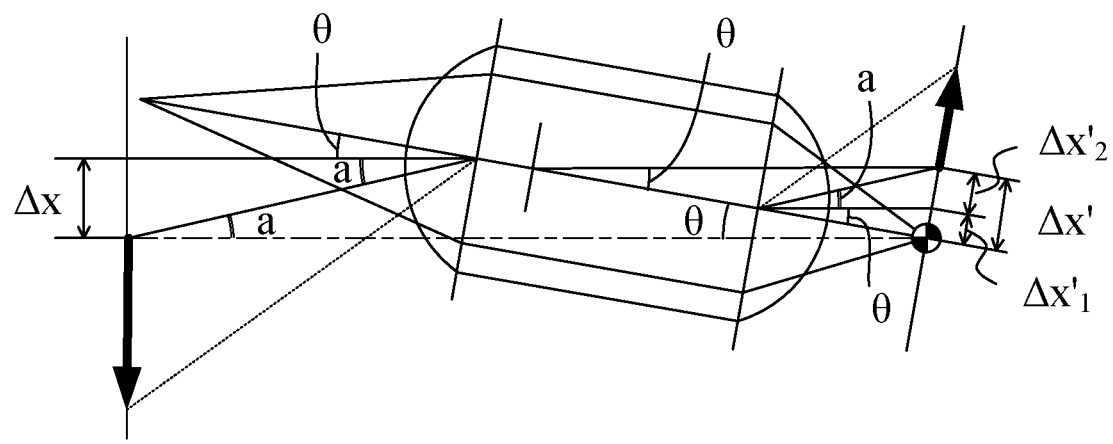

FIG. 7D illustrates an optical path diagram when the arbitrary point in FIG. 7C is fixed at the intersection of the imaging plane and the optical axis. At this time, the distance l is a distance from the front principal point of the optical system to the imaging plane, which is a known value. The displacement amount Δx' of the imaging position on the imaging plane can be expressed by a function of θ as in the following expression (3).

$$\Delta x' \approx (s' + l\beta)\theta \ldots \quad (3)$$

A target driving amount $K_2\theta$ of the image-stabilizing lens unit 108 is calculated such that the image is moved by $(s'+l\beta)\theta$ on the imaging plane, and the lens image-stabilizer 206 drives the image-stabilizing lens unit 108 to the target driving amount $K_2\theta$. Thereby, the angular image stabilization and the translational image stabilization are available. A coefficient $K_2$ is defined as an imaging-plane reference OIS sensitivity.

Generally, in the handheld imaging, the user holds the image pickup apparatus (camera body) for imaging, and it is thus predicted that the rotation center of the image pickup apparatus is located near the imaging plane. When the image pickup apparatus has a translational image-stabilizing function, the translational image stabilization is made and the angular image stabilization is simultaneously made using the front principal-point reference OIS sensitivity. On the other hand, when the image pickup apparatus has no translational image-stabilizing function, the angular image stabilization is made by using the imaging-plane reference OIS sensitivity. In this way, a proper image-stabilizing effect can be obtained by switching the OIS sensitivity according to the situation.

As described above, the interchangeable lens according to this embodiment can provide a proper image stabilization regardless of whether the image pickup apparatus has a translational image-stabilizing function.

Second Embodiment

Figure 8:
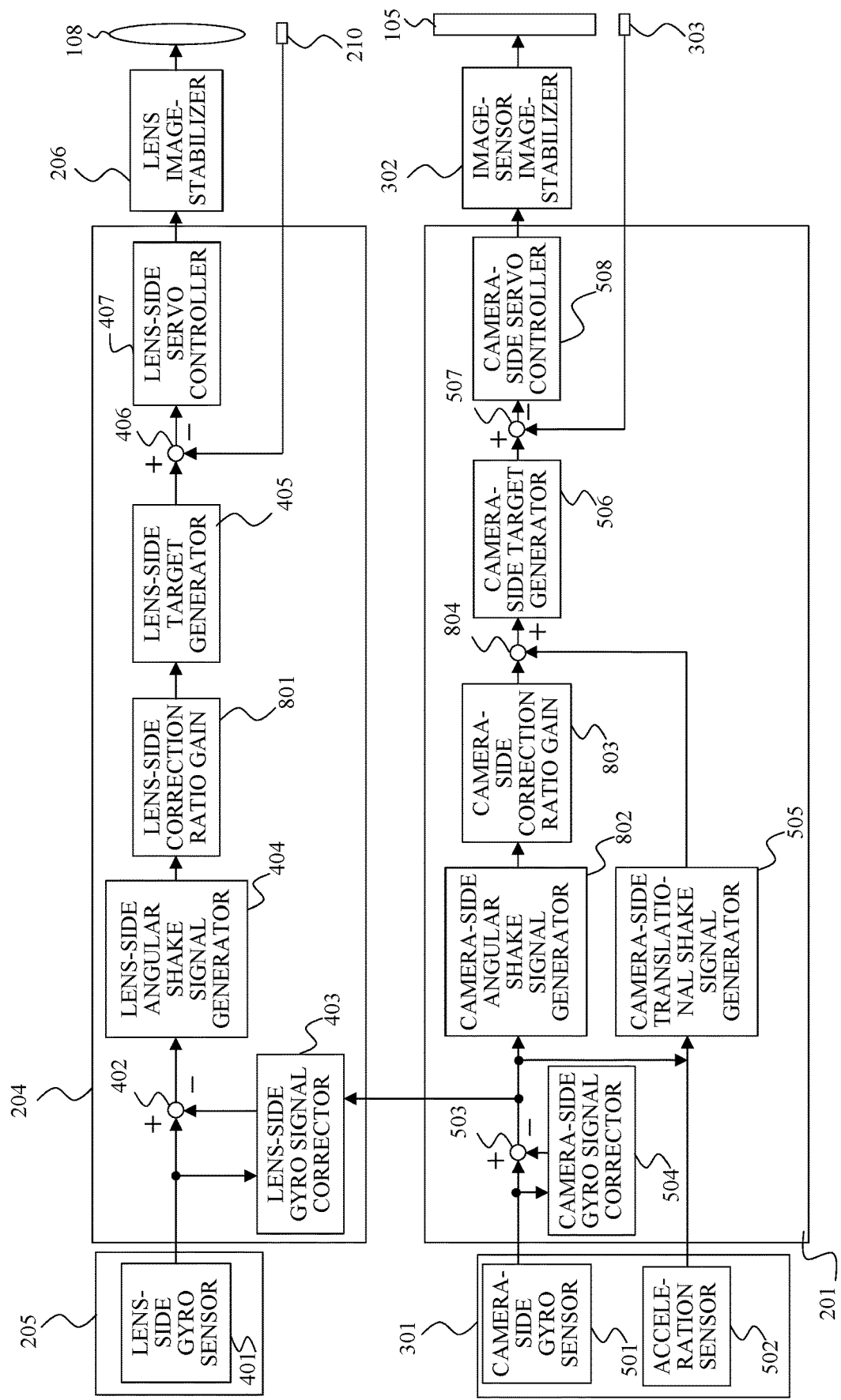
FIG. 8 is a block diagram of an image-stabilizing system controller according to a second embodiment.
Figure 9:
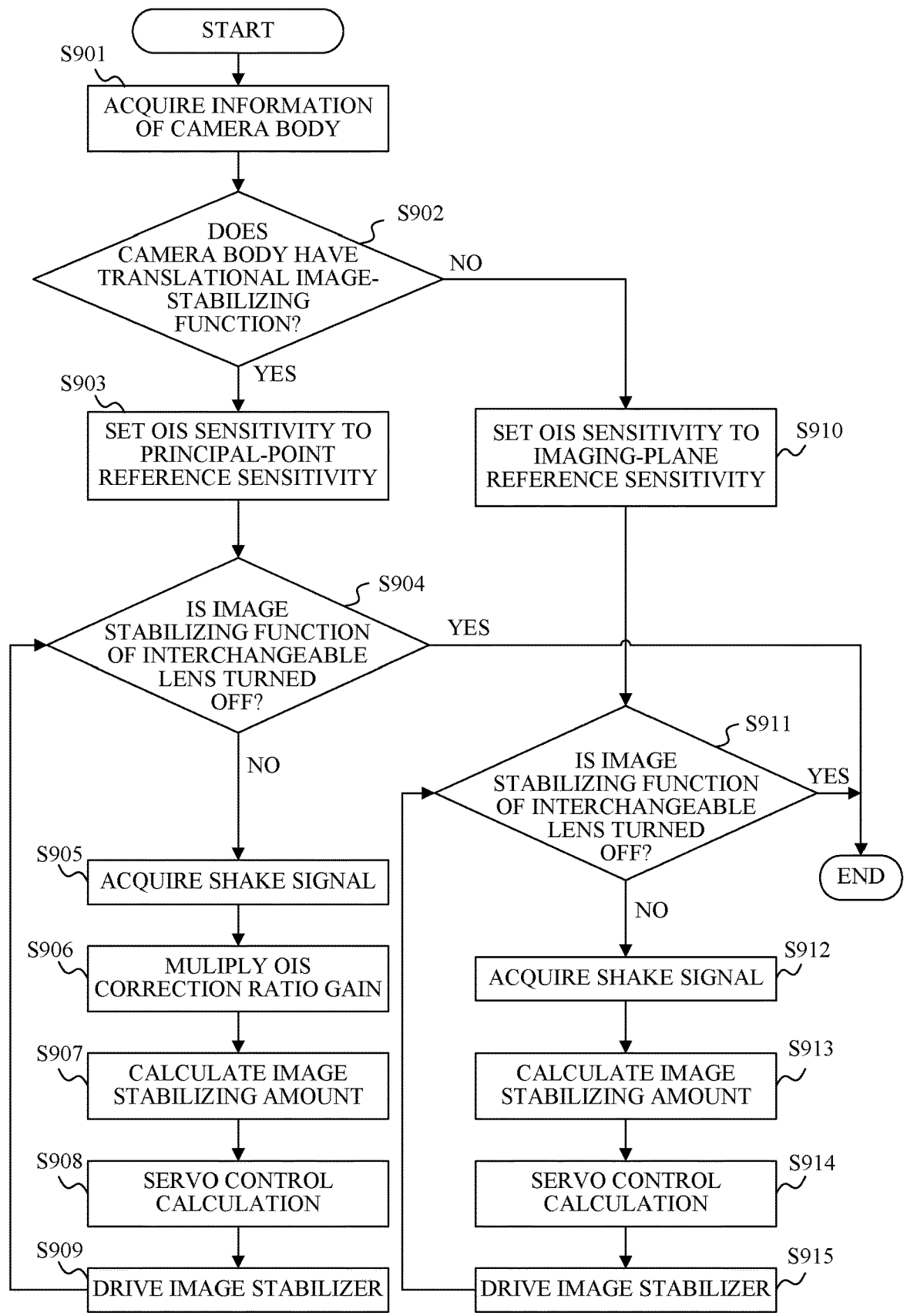
FIG. 9 is a flowchart of image stabilizing processing in an interchangeable lens according to the second embodiment.

Referring now to FIGS. 8 and 9, a description will be given of an image pickup system according to a second embodiment of the present invention. When the interchangeable lens 102 has a translational image-stabilizing function, the first embodiment provides the image stabilization in which the lens image-stabilizer 206 provides the angular image stabilization and the image-sensor image-stabilizer 302 provides the translational image stabilization. On the other hand, in this embodiment, the angular image stabilization is made by both the lens image-stabilizer 206 and the image-sensor image-stabilizer 302. A description will now be given of only differences from the first embodiment.

In this embodiment, both the lens image-stabilizer 206 and the image-sensor image-stabilizer 302 simultaneously provide the angle image stabilizations based on the shake information of both the lens shake detector 205 and the camera shake detector 301. If the lens-side shake detector and the camera-side shake detector are similarly driven, the actually detected shake is double-corrected and the shake is augmented. Accordingly, this embodiment determines a share ratio of each image stabilizer in the image stabilization using the actually detected shake amounts, a lens-side correction ratio gain 801, and a camera-side correction ratio gain 803. For example, when the lens-side correction ratio gain 801 and the camera-side correction ratio gain 803 are set to 50% each, each image stabilizer shares half of the detected shake amount and performs the 100% image stabilization by simultaneous driving. Since it is necessary to communicate various information on the interchangeable lens side and various information on the image pickup apparatus side with each other, information is reciprocated through communications via the electrical contact 107 by setting the interchangeable lens side to a slave and the image pickup apparatus side to a master.

FIG. 8 is a block diagram of the image-stabilizing system controller according to this embodiment when the image pickup apparatus is the image pickup apparatus 101 illustrated in FIG. 3. In addition to the elements illustrated in FIG. 5, the image-stabilizing system controller according to this embodiment includes a lens-side correction ratio gain 801, a camera-side angular shake signal generator 802, a camera-side correction ratio gain 803, and an adder 804. The camera system controller 201 adds, at the adder 804, the translational shake signal generated by the camera-side translational shake signal generator 505 to a signal made by multiplying the angular shake signal generated by the camera-side angular shake signal generator 802 by the share ratio of the image pickup apparatus using the camera-side correction ratio gain 803. The camera-side target generator 506 determines the driving amount of the image-sensor image-stabilizer 302 based on the signal generated by the adder 804.

FIG. 9 is a flowchart of image stabilizing processing in the interchangeable lens 102 in this embodiment. When power is supplied to the image pickup apparatus 101 and the interchangeable lens 102, the lens system controller 204 starts processing. First, in the step S901, the lens system controller 204 acquires information on the image pickup apparatus (camera body) through communications. The information of the image pickup apparatus includes information on whether or not the image pickup apparatus has a translational image-stabilizing function. It may include information for determining the share ratio of the angular image stabilization, such as a drivable stroke of the image pickup apparatus 105.

Next, in the step S902, the lens system controller 204 determines whether or not the image pickup apparatus has the translational image-stabilizing function, based on the information of the image pickup apparatus acquired in the step S901. If the image pickup apparatus has the translational image-stabilizing function, that is, if the image pickup apparatus is the image pickup apparatus 101a illustrated in FIGS. 3 and 8, the flow proceeds to the step S903. On the other hand, if the image pickup apparatus has no translational image-stabilizing function, that is, if the image pickup apparatus is the image pickup apparatus 101 illustrated in FIGS. 2 and 4, the flow proceeds to the step S910. The steps S903 to S905 are the same as the steps S603, S605, and S606 in FIG. 6, respectively.

In the step S906, the lens system controller 204 multiplies the angular shake signal by the OIS correction ratio by the lens-side correction ratio gain 801. The OIS correction ratio can use a predetermined value (predetermined ratio). Alternatively, either the lens system controller 204 or the camera system controller 201 may determine the OIS correction ratio based on the information of the interchangeable lens and the image pickup apparatus. The subsequent steps S907 to S909 are similar to the steps S607 to S609 in FIG. 6, respectively. The steps S910 to S915 are similar to the steps S604 to S609 in FIG. 6, respectively.

In this embodiment, the image pickup apparatus provides the translational image stabilization and both the image pickup apparatus and the interchangeable lens provide the angular image stabilization, but the translational and angular image stabilizations may be provided by both the image pickup apparatus and the interchangeable lens. In this case, similar to the angular shake signal, the detected translational shake signal is multiplied by the correction ratio gains of the image pickup apparatus and the interchangeable lens. The interchangeable lens needs to acquire the translational shake signal or the information for calculating the translational shake signal from the image pickup apparatus by using the communication through the electric contact 107 or the like.

In this embodiment, the interchangeable lens and the image pickup apparatus generate angular shake signals based on the information of the respective gyro sensors, but may generate an angular shake signal based on the information of the gyro sensor of either the interchangeable lens or the image pickup apparatus. In this embodiment, the lens system controller 204 determines the reference position of the OIS sensitivity depending on whether or not the image pickup apparatus has the image stabilizing function, but may determine that depending on whether or not the image pickup apparatus has the translational image stabilizer. For example, when a interchangeable lens is attached to an image pickup apparatus that has no image stabilizing function but has a translational shake detector, the interchangeable lens may provide the angular image stabilization using the front principal-point reference OIS sensitivity and may provide the translational image stabilization using the translational shake signal detected by the image pickup apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In each embodiment, the controller calculates a driving amount using the rotation angle based on the output of the detector and the information (OIS sensitivity) for converting a rotation angle into the driving amount. The controller changes the information based on the image pickup apparatus attached to the lens apparatus. Thus, each embodiment can provide a lens apparatus, an image pickup system, a control method of the lens apparatus, and a storage medium, each of which can perform a proper image stabilization regardless of whether or not the camera body has the translational image-stabilizing function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-021581, filed on Feb. 15, 2021, which is hereby incorporated by reference herein in its entirety.

What is claimed is:

1. A lens apparatus attachable to and detachable from an image pickup apparatus, the lens apparatus comprising:
   a detector configured to detect an angular shake of the lens apparatus and output an angular shake signal;
   an image stabilizer configured to provide an image stabilization by driving part of an imaging optical system in the lens apparatus; and a controller configured to calculate a driving amount using the angular shake signal, and information for converting the angular shake signal into the driving amount, wherein the controller determines a type of the image pickup apparatus attached to the lens apparatus, and changes the information based on the determined type of the image pickup apparatus.

2. The lens apparatus according to claim 1, wherein the information includes a conversion coefficient to be multiplied by the angular shake signal.

3. The lens apparatus according to claim 1, wherein the information includes sensitivity of an image-stabilizing lens unit that constitutes the part of the imaging optical system.

4. The lens apparatus according to claim 1, wherein the controller determines the type of the image pickup apparatus from among at least an image pickup apparatus that includes a translational image-stabilizing function and an image pickup apparatus that does not include the translational image-stabilizing function.

5. The lens apparatus according to claim 4, wherein when the image pickup apparatus has the translational image-stabilizing function, the information includes information for converting the angular shake signal centered on a principal point position of the imaging optical system in the lens apparatus.

6. The lens apparatus according to claim 4, wherein when the image pickup apparatus has no translational image-stabilizing function, the information includes information for converting the angular shake signal centered on a point located on an imaging plane of the image pickup apparatus.

7. The lens apparatus according to claim 4, wherein when the image pickup apparatus has the translational image-stabilizing function, the controller calculates the driving amount using a predetermined ratio.

8. An image pickup system comprising:
a lens apparatus; and
an image pickup apparatus,
wherein the lens apparatus is attachable to and detachable from an image pickup apparatus,
wherein the lens apparatus includes:
   a detector configured to detect an angular shake of the lens apparatus and output an angular shake signal;
   an image stabilizer configured to provide an image stabilization by driving part of an imaging optical system in the lens apparatus; and
   a controller configured to calculate a driving amount using the angular shake signal, and information for converting the angular shake signal into the driving amount, and
   wherein the controller determines a type of the image pickup apparatus attached to the lens apparatus, and changes the information based on the determined type of image pickup apparatus.

9. A control method for a lens apparatus attachable to and detachable from an image pickup apparatus, the control method comprising the steps of:
   detecting an angular shake of the lens apparatus using a detector configured to detect the angular shake of the lens apparatus and output an angular shake signal;
   calculating a driving amount of part of an imaging optical system in the lens apparatus using the angular shake signal, and information for converting the angular shake signal into the driving amount; and
   providing an image stabilization by driving the part of the imaging optical system,
   wherein the calculating step determines a type of the image pickup apparatus attached to the lens apparatus, and changes the information based on the determined type of the image pickup apparatus.

10. A non-transitory computer-readable storage medium storing a program executable by a computer to execute the control method according to claim 9.

* * * * *